United States Patent
Pross et al.

(10) Patent No.: US 6,548,619 B2
(45) Date of Patent: Apr. 15, 2003

(54) PROCESS FOR THE PRODUCTION OF POLYURETHANE PARTICLES

(75) Inventors: Alexander Pross, Bergisch Gladbach (DE); Heinz-Werner Lucas, Bergisch Gladbach (DE); Horst Stepanski, Leverkusen (DE); Eckhardt Weidner, Bochum (DE); Marcus Petermann, Semperstr. 115, 44801 Bochum (DE); Andreas Kilzer, Witten (DE)

(73) Assignees: Eckhard Weidner (DE); Marcus Petermann; Andreas Zilzer (DE)

( * ) Notice: Subject to any disclaimer, the term of this patent is extended or adjusted under 35 U.S.C. 154(b) by 0 days.

(21) Appl. No.: 09/928,264

(22) Filed: Aug. 10, 2001

(65) Prior Publication Data

US 2002/0049298 A1 Apr. 25, 2002

(30) Foreign Application Priority Data

Aug. 15, 2000 (DE) ......................................... 100 40 551

(51) Int. Cl.⁷ ............................................. C08G 18/42
(52) U.S. Cl. ............................ 528/80; 525/440; 264/14
(58) Field of Search ........................... 528/80; 525/440; 264/14

(56) References Cited

U.S. PATENT DOCUMENTS

| 3,718,518 A | | 2/1973 | Bock et al. ................. 156/242 |
| 4,141,869 A | * | 2/1979 | Hoss et al. |
| 4,403,084 A | | 9/1983 | McGray, Jr. et al. ......... 528/45 |
| 4,795,330 A | | 1/1989 | Noakes et al. ................. 425/6 |
| 6,056,791 A | | 5/2000 | Weidner et al. ........... 23/295 R |

FOREIGN PATENT DOCUMENTS

| CA | 2125076 | 12/1994 |
| DE | 1256882 | 12/1967 |

OTHER PUBLICATIONS

J. of Coated Fabrics, vol. 26, Apr. 1997, pp. 316–322, Stuart Grant and David Forrest, Production of Powders for Coating and Bonding of Textiles.

Coating, No. 2, Feb. 1993, pp. 34–38, Dr. Hans–Joachim Studt, Schmelzklebefolien und deren Anwendung.

Adhäsion, No. 5, (month unavailable) 1997, pp. 34–37, Joachim Hürten and Josef Spijkers, Laminieurung von Sympatex Membranen (Teil 2).

Plastverarbeiter, 40, (month unavailable) 1989, pp. 100–106, Udo Barth, Kontinuierliche Herstellung massiver Polyurethanprodukte.

Hydrocarbon Engineering, Oct. 1998, No. 10, pp. 52–54, Stefan Gehrmann, Trends in Granulation Technology.

Adhesive Age, Feb. 1997, No. 2, pp. 18–23, Dr. H.–W. Lucas, Dr. G. Festel, Ing. J. Ramthun, Dr. R. Witkowski, Dr. J. Dormish, Hot–Tack Measurements: An Efficient Development Tool for Water–Based Polyurethanes.

Adhesives Age, Aug. 1998, No. 8, pp. 28–32, Ulrich Simon, Formulating and Applying Pastedot Adhesives for Optimum Performance.

* cited by examiner

Primary Examiner—Rachel Gorr
(74) Attorney, Agent, or Firm—Webb Ziesenheim Logsdon Orkin & Hanson, P.C.

(57) ABSTRACT

The present invention relates to a process for the production of particles from solutions or melts of heat-activatable polyurethanes by i) dissolving a compressible auxiliary agent at a pressure of between 50 and 1000 bar into a conveyable solution or melt of a heat-activatable polyurethane to obtain a mixture of polyurethane, compressible auxiliary agent and optionally solvent, ii) optionally adjusting of the temperature of the resulting mixture to a temperature of from 40° K below to 150° K above the crystallite melting point of the polyurethane, iii) expanding the mixture by means of an expansion device into a container, while adjusting the temperature in the container to at least 5° K below the softening temperature of the polyurethane to maintain the open jet particles in a form in which they do not agglomerate, and iv) separating the formed particles from the stream of decompressed compressible auxiliary agent and optionally solvent.

17 Claims, 3 Drawing Sheets

PROCESS FOR THE PRODUCTION OF POLYURETHANE PARTICLES

BACKGROUND OF THE INVENTION

1. Field of the Invention

The present invention relates to a process for the particulate preparation of heat-activatable polyurethanes from the solution or the melt. The particles produced according to the invention are suitable for bonding different substrates.

2. Description of the Prior Art

Heat-activatable polyurethanes are worked up from solutions or melts thereof by dissolving a compressible auxiliary agent under pressure into the initial batch of solution or melt and by means of an expansion device spraying the solution obtained, such that particles result which are finally separated from the stream of expanded auxiliary agent and optionally of solvent. Such particles are suitable as adhesives or for the manufacture of adhesives.

Heat-activatable polyurethanes are segmented polyurethanes based on crystallizing oligomeric dihydroxy compounds having a molecular weight of basically between 500 and 5000 g/mol, preferably polyesters, as an option supplemented by amorphous oligomeric dihydroxy compounds, furthermore aromatic or aliphatic diisocyanates, as an option low molecular weight difunctional chain extenders, and, also as an option, further additives such as light stabilisers, antioxidants, powdering agents as well as polyfunctional cross-linking molecules, preferably isocyanates in free or blocked form.

Such compounds are distinguished in that their so-called soft segments decrystallise at a temperature of, for example, 50° C. which is still comparatively low. This substance-dependent temperature is termed hereinbelow the "crystallite melting point", and it can be determined by DSC, for example.

The use of heat-activatable polyurethanes as adhesives for bonding the most varied materials to themselves and to other materials is known from, for example, DE-A-1 256 822 and DE-A-1 930 336.

Heat activation can in practice be achieved by brief irradiation with infrared light or by a short residence time in a hot air oven or heating tunnel. In the heat-activated state the adhesive film is tacky and can be joined. The flow behaviour of these polymers is, on the other hand, determined by the strong intermolecular interactions of their urethane groups, such that although still in the activated state, the adhesive film in the bonded joint builds up a very high immediate strength and takes on the resilience of the adherends. Moreover a long-term service temperature of the adhered bond, which is markedly above the crystallite melting point is achieved thereby.

The recrystallisation of the soft segments after thermal activation takes a certain amount of time which, depending on the chemical composition of the polyurethane and the ambient temperature, may last from minutes to hours. It can, for example, be tracked by taking repeated measurements of the Shore A hardness of cooling polymer films. The delayed recrystallisation affords a specific temporal window within which the film adhesive can be readily joined, that is to say with slight pressure and within a short contact time. This is naturally also dependent on the joining pressure and joining time and is in practice generally between a few seconds and some minutes. This period is frequently termed the "hot tack life" (Festel et al., Adhäsion, No. 5, 1997, 16).

As a result of these specific properties heat-activatable polyurethanes meet the requirements of modern joining technology, that is to say they provide high immediate strength with simultaneously a long processing time after heat-activation.

It is known that adhesives based on heat-activatable polyurethanes may be used not only as solutions in organic solvents or as aqueous dispersions (H. W. Lucas et al., Adhesives Age No. 2, 1997, 18), but also in solvent-free or carrier medium-free manner, in the form of film adhesives (H. J. Studt, Coating No. 2, 1993, 34), adhesive nets (J. H ürten et al., Adhäsion No. 3, 1997, 34) or adhesive fleeces (EP-A-0 628 650), as well as in the form of adhesive powders or adhesive pastes (H. Simon, Adhesives Age No. 8, 1998, 28). Powdered adhesives are becoming increasingly important in modern joining technology, for instance for the bonding of textiles. The different flat textile structures based, for instance, on cotton, cotton mixed textiles, wool, wool mixed textiles, polyester and polyamide textiles as well as polyolefins, might in particular be named as substrates which are considered in this context. Here, particle sizes below 600 $\mu$m are suitable for simple scatter applications, however particle sizes below 200 $\mu$m and in particular below 100 $\mu$m, which are suitable for the paste dot or double dot process, for example, are preferred.

The heat-activatable polyurethanes are prepared by polyaddition of the aforementioned adducts in a concentrated solution (stirred reactor technique) or melt (reaction screw technique, mixing head technique). (U. Barth, Plastverarbeiter 40 (1989) No. 1). Since in a solution process in accordance with current practice the process solvent is first separated by vaporisation, the high-viscosity polyurethane melt constitutes an intermediate which is independent of the process and must be converted by a suitable process step into a tack-free, processable product. Under process conditions (that is to say at temperatures of from 130 to 180° C. and shear rates of from 10 to 300 s$^{-1}$) the melt viscosities of such polyurethanes are generally above 1,000 Pa·s (measured in a high-pressure capillary viscometer with 30/2 mm nozzle geometry, (model Rheograph 2002, from Göttfert, DE).

Prior art in the stirred reactor and reaction screw processes is to granulate the polymer melt by way of an extruder into a circulating turbulent cold water stream, whereby the length of the closed circular pipeline is calculated such that on its single passage each granule particle has a residence time in the region of a few minutes, in order to become tack-free as a result of the advancing soft segment crystallisation. If, on the other hand, the granules reach the separator and the downstream apparatus prematurely, there is a risk of agglomeration and blockage. It is essential to remember that for this it is not the surface temperature of the granules suspended in the water stream which constitutes the limiting factor, but the delayed recrystallisation caused by the chemical composition.

In addition to the considerable capital cost and operating and maintenance costs of industrial-scale screw machines and an infrastructure of water circuits, separators, dryers, conveying apparatus and the like, a further disadvantage is the high stressing of the product due to heat and shear forces during the extrusion phase and also, in the case of the solution process, during the evaporation phase, which, in particular in conjunction with subsequent contact between the melt and the granulating water is always associated with the risk of undesirable chain degradation and thermooxidative ageing. Moreover, even when the so-called microgranulation technique is used, the particle sizes cannot be reduced below approximately 1 mm.

Processes in which the product, which is cast by way of a mixing head onto a belt (in continuous operation) or into slabs or blocks (in batch operation) and heat-treated, is peeled from the belt or, manually, from the moulds after cooling and then ground to the desired particle size, are an alternative. In this case the material being ground must be prevented by suitable cooling measures from heating beyond the crystallite melting point as a result of the grinding energy input, which could result in blocking. When this is scaled up into the range which is relevant to industry, however, the costs of such processes, which rise in linear fashion with the installed capacity, very soon exceed the comparable outlay on a stirred reactor or reaction screw process. There are moreover reservations concerning the occupational health aspects of the mixing head process in batch operation.

Powder-like particle sizes can be obtained with the described processes only by a special cryogenic grinding technique which uses liquid nitrogen cooling (S. Grant et al., Journal of Coated Fabrics No. 4, 1997, 316), with the outlay for maintenance and cleaning of the mills constituting, in addition to the high gas requirement, a considerable technical outlay which is per se undesirable.

Pastillating is a highly developed technology for shaping viscous melts. Here, the melt is discharged from a suitable component (for example a rotating drum) having special openings and fittings (for example nozzle/needle, bell/plunger) operating in cycled manner, onto a cooled surface (for example a moving belt or rotary table). The upper limit of this technology in viscosity terms is approximately 100 Pa·s, and the minimum particle size approximately 1 mm (S. Gehrmann, Hydrocarbon Engineering No. 10, 1998, 1). This technology is therefore not considered for the heat-activatable polyurethanes described above.

The so-called PGSS process (particles from gas saturated solutions) is known from EP-A-0 744 992 as a process for the preparation of particles or powders. It is based on the fact that dissolving a gas under pressure in a solution or melt of the valuable material and then spraying the gas-containing (preferably gas-saturated) solution or melt is frequently sufficient to produce particles. Expanding the gas brings about cooling, the extent of which can be selected by means of the gas loading such as to be below the solidifying temperature of the valuable material, causing the latter to arise in particulate form and enabling it to be separated from the gas stream. Solvents that may be present are carried away with the off-gas stream, such that the PGSS process can also be used alongside shaping to separate the valuable material simultaneously from a solution. Unlike other high-pressure process techniques for powder production, the gas requirement in PGSS is considerably reduced, such that this process is currently alone in being considered for industrial-scale application.

Not only many low molecular weight substances, but also polymers can be powdered by the process described in EP-A-0 744 992. For this purpose, however, the gas-laden substance mixture must be conveyable and sprayable. It is known from the spray-drying and spray-cooling field that there is an upper limit to the viscosity of the spraying medium; it must generally be from less than 1 to 10 Pa·s. Under process conditions, however, the heat-activatable polyurethanes described above have melt viscosities of from 1,000 to 10,000 Pa·s, i.e. higher by orders of magnitude, three. The polymers which are considered must furthermore have the property of solidifying spontaneously at temperatures below their individual softening temperature. However, in the case of the heat-activatable polyurethanes described above, the property of delayed crystallisation of the polyester segments, desirable per se, conflicts with processing by the PGSS process, because the necessary spray tower would have to allow dropping times of several minutes in order to avoid agglomeration of the tacky particles. No corresponding apparatus is known. The treatment of solutions or melts of heat-activatable polyurethanes by the PGSS process was therefore neither provided by the prior art nor obvious.

An object of the present invention is to provide a particulate working-up of heat-activatable polyurethanes from the solution or the melt, which without the disadvantages of existing technologies provides the product in a form having the greatest possible fine division, freedom from tack, conveyability, storability and saleability.

It was possible to achieve this object by the process according to the invention, in accordance with which it is possible to produce particles of heat-activatable polyurethanes by the spraying of gas-containing solutions or melts.

SUMMARY OF THE INVENTION

The present invention relates to a process for the production of particles from solutions or melts of heat-activatable polyurethanes which are based on the reaction product of a) crystallizing oligomeric dihydroxy compounds, b) optionally amorphous oligomeric dihydroxy compounds in an amount by weight which is less than the amount of component a), c) aromatic and/or aliphatic diisocyanates and d) optionally low molecular weight difunctional chain extenders, optionally in admixture with e) light stabilizers, antioxidants, powdering agents or polyfunctional cross-linking compounds, by i) dissolving a compressible auxiliary agent at a pressure of between 50 and 1000 bar into a conveyable solution or melt of a heat-activatable polyurethane to obtain a mixture of polyurethane, compressible auxiliary agent and optionally solvent, ii) optionally adjusting of the temperature of the resulting mixture to a temperature of from 40° K below to 150° K above the crystallite melting point of the polyurethane, iii) expanding the mixture by means of an expansion device into a container, while adjusting the temperature in the container to at least 5° K below the softening temperature of the polyurethane to maintain the open jet particles in a form in which they do not agglomerate, and iv) separating the formed particles from the stream of decompressed compressible auxiliary agent and optionally solvent.

DETAILED DESCRIPTION OF THE INVENTION

Figure 1:
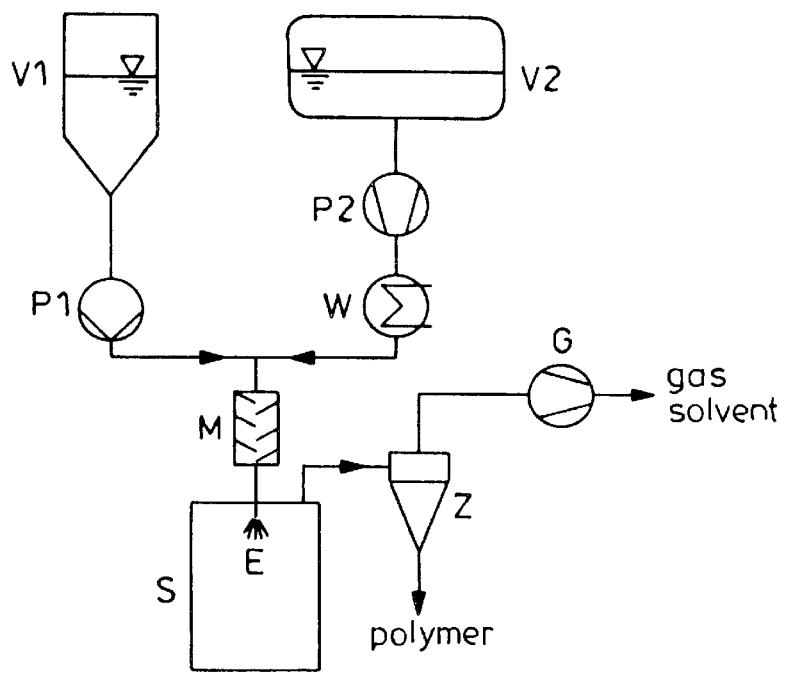
FIG. 1 represents a first embodiment of the process according to the invention.

All oligomers having a number average molecular weight of between 500 and 5000 g/mol and a thermoanalytically detectable crystallizing of the chains, preferably having a crystallite melting point above room temperature, are suitable as the crystallizing dihydroxy compounds. Examples include polyesters, for example, those based on adipic acid and low molecular weight chain extenders or also based on caprolactone. Certain polyethers, for example, those prepared from tetrahydrofuran, and also polycarbonates are also suitable. Mixtures of the substances considered may naturally also be utilized.

In addition to crystallizing dihydroxy compounds, contents of non-crystallizing, i.e. amorphous dihydroxy compounds, may also optionally be utilized. Examples include polyesters such as orthophthalic acid; polyethers, such as polypropylene oxides; polyolefins such as modified polybutadienes; and modified polyacrylates. Mixtures of these polymers may also be used.

The aromatic diisocyanates are preferably MDI and/or TDI, and the aliphatic diisocyanates are preferably HDI, $H_6$-TDI, $H_{12}$-MDI and/or IPDI. Mixtures of these diisocyanate may also be utilized.

Diols are preferably utilized as the low molecular weight chain extenders. Of these, 1,4-butanediol and/or 1,6-hexanediol are preferably used. However, diamines or amino alcohols as well as phenol derivatives are also suitable. Furthermore the chain extenders used may be ionically modified, for instance by sulfonate or carboxylate groups. Mixtures of the these compounds may also be utilized.

The cross-linking compounds which may optionally be present are preferably polyfunctional isocyanates in blocked or free form. This also includes difunctional isocyanates such as the uretdione dimer or the urea dimer of TDI. Mixtures of the compounds may also be used.

In a preferred embodiment the process according to the invention is carried out with a polyurethane which is dissolved in an organic solvent or solvent mixture, preferably in toluene. The proportion by weight of polyurethane in the mixture is in this case preferably from 40 to 100 wt. %. In addition to the polyurethane, a process solvent at a concentration, in relation to the mixture of up to 60 wt. % is charged initially.

In another preferred embodiment the process according to the invention is carried out with virtually solvent-free polyurethane, that is to say with a solvent content of the mixture of less than 0.5 wt. %.

Suitable compressible auxiliary agents for the process according to the invention include carbon dioxide, n- or iso-alkanes (such as ethane, propane or butane), n- or iso-alkenes (such as ethene, propene or butene), halogen-containing hydrocarbons, ethers (such as dimethyl ether, ethyl methyl ether or diethyl ether), nitrogenous compounds (such as nitrogen, ammonia or dinitrogen monoxide) sulfur hexafluoride and mixtures thereof. However, other compressible auxiliary agents may also be used. Carbon dioxide is preferred.

Depending on the specific parameters of a working variant of the process according to the invention, the pressure is adjusted during dissolution of the compressible auxiliary agent. The optimal pressure for the system will in each case be determined by routine pre-testing by those skilled in the art. It will generally be within the range 50 to 1000 bar, preferably within the range 80 to 800 bar and more preferably within the range 100 to 600 bar.

The temperature during dissolution is up to 150° K, in particular up to 100° K, above the crystallite melting point of the solvent-free polyurethane. It may, however, also be up to 40° K below the crystallite melting point.

The process according to the invention is preferably operated in continuous manner. A pulsation-reduced, continuous supply of the polymer solution or polymer melt to the mixing element has proved to be advantageous. The following conveying units are suitable, depending on the polyurethane to be processed; the preferred units are selected in accordance with conventional process engineering rules:

gear pumps meet the requirements for a pulsation-reduced conveying characteristic, but are limited by the differential pressure between the suction and delivery sides. Besides there is a risk of gas surge-back into the initial batch of polymer through the sealing gap, which is filled with conveying medium. Typically, differential pressures of from 100 to 300 bar can be achieved with polymer melts of mostly non-newtonian flow, which can be sufficient for carrying out the invention.

extruders can generate greater differential pressures than gear pumps. However, as with gear pumps, under certain operating conditions there is a risk of gas surge-back into the suction line, which can be disadvantageous for the initial batch of polymer.

reciprocating pumps have proved to be preferred embodiments.

A reciprocating pump enables high differential pressures and is simultaneously more secure against surge-back owing to its design. In a further embodiment as a reciprocating diaphragm pump (termed hereinbelow "diaphragm pump"), solidification of the polymer, such as may occur in, for example, reciprocating pumps sealed with a gland, is furthermore avoided. However, the successful use of reciprocating pumps for low-pulse conveying of polymer solutions or polymer melts requires a specific design and operating method:

pulsation-reduced conveying is achieved by multiple-head design, for example 3 pump heads with phases offset by 120°, or by linking a number of individual pumps, for example so-called double plunger pumps.

the feed of high-viscosity substances into the cylinders of the reciprocating pump heads is achieved by
application of high static pressures in the initial batch vessel,
use of special valves in the pump heads,
use of booster pumps on the suction side to increase the pressure (termed hereinbelow "admission pumps"), for example gear pumps,
matching of the quantities conveyed by the admission pump(s) and the reciprocating pump(s) in electronic manner, for example by mass flow and/or volume flow measurement, frequency regulators electric stroke adjustment, or mechanically by the use of attenuators between the admission pump and the reciprocating pump, as well as
combinations of the possibilities indicated.

The polymer is supplied to a mixing station by means of the measures described. In the mixing station the polymer solution or polymer melt is contacted with a compressed gas. This can be effected in co-current, counter-current and/or cross-current as well as by rotational flow. An improvement in the mixing action or a pre-dispersion of the gas in the polymer solution or polymer melt can furthermore be obtained by additional flow-breaking fittings in the mixing station, the use of filtering materials, for example sintered metals, or the use of a mechanically driven mixer or kneader, as well as combinations of the possibilities indicated.

The dissolution of the compressible auxiliary agent in highly viscous, strongly cohesive media can be optimised by effecting the dissolution in an autoclave by means of pumping round either the high-viscosity polymer-containing phase or the low-viscosity gas-containing phase or both phases in co-current, counter-current or cross-current, optionally with use of a stirring element or by exclusive use of a stirring element, in an extruder or in a static mixer.

For this purpose at least two substance streams, namely a polymer solution or polymer melt and a gas which differ in their viscosity by up to seven orders of magnitude are to be mixed together. The ratio of the volumes of polymer solution or polymer melt to compressed gas is from 0.5 to 30, in particular 1 to 20. According to K. J. Myers et al. (Chemical Engineering Progress No. 6, 1997, 30) static mixers are per se unsuitable for such differences in substance values and volume flows. It has, however, been found in a manner which is surprising and could not be foreseen by those skilled in the art that when certain conditions are observed static mixers can be utilized in order to achieve the object according to the invention. The use of a static mixer is preferred because of the simple, cost-effective design.

The pressure downstream of the static mixer or immediately upstream of the expansion element is between 80 and 600 bar, preferably between 100 and 350 bar. The pressure losses which occur along the static mixer are in large part dependent on the actual viscosity and the phase ratio and can be from 1 to 400 bar, preferably 10 to 300 bar and in particular 15 to 250 bar. This means that upstream of the static mixer a pressure prevails which can be considerably higher than the pressure downstream of the static mixer. A high pressure loss stands for a high energy input into the medium in the form of high shear rates and flow velocities, and consequently favours the dissolution of a sufficient quantity of the compressible auxiliary agent in the viscous polymer phase.

The gas-containing solution formed in the static mixer is atomised in an expansion device together with any excess gas which is present. A nozzle is preferably used as the expansion device.

The temperature downstream of the expansion is adjusted such that a tack-free pulverulent product is obtained. This is achieved when the temperature downstream of the expansion is at least 5° K, preferably more than 30° K and in particular more than 50° K, below the crystallite melting point of the polyurethane. This can be achieved, for example, by the use of heat exchangers along the conveying paths, by exploiting the Joule-Thomson effect of the expanding gas, i.e. by regulating the substance streams in a manner known to those skilled in the art, by an additional cooling in the spray tower, as well as by a combination of the possibilities indicated.

In a preferred embodiment the particles formed are separated in fractional manner, particularly preferably by guiding the particle stream first through a spray tower, then through a cyclone and then through a fine filter.

The particles obtained according to the invention are preferably utilized as an adhesive or for the manufacture of adhesives.

The diagrams, together with the explanations below, serve to illustrate the process according to the invention in greater detail. Interpretation thereof should in no way be restrictive.

According to FIG. 1 the heat-activatable polyurethane is melted in a supply vessel V1 and heated to a temperature which is up to 150° K and in particular up to 100° K above the individual crystallite melting point thereof (measured as a peak maximum in DSC at a heating rate of 20 K/min). Here, the polymer may be present either in pure form or, depending on by the process, in mixture with a solvent. Reference hereinbelow will at all times be made generally to a feed-polyurethane. In each case the crystallite melting point of the solvent-free polymer serves as the reference temperature. The percentage by weight of the polyurethane in the feed polyurethane may be from 40 to 100 wt. %. A pump P1 conveys the polyurethane melt to a mixing station M. Here, extruders, and gear, reciprocating, diaphragm, eccentric screw, vane-cell and centrifugal pumps, for example, are considered as the conveying elements. The choice of the conveying element depends on by the rheology of the feed polyurethane. Preferred embodiments are gear, reciprocating and diaphragm pumps and extruders as well as combinations thereof.

The compressible auxiliary agent is stored in a supply container V2 and is compressed by a compressor P2. Some appropriate compressible auxiliary agents have been described above. Reciprocating and diaphragm pumps, but also piston and diaphragm-type compressors, may be selected for the compression. The compressed compressible auxiliary agent (for the sake of simplicity termed hereinbelow "gas") is then heated in a heat exchanger W. The temperature of the heated gas can here be adjusted to values below or above the crystallite melting point of the polymer.

The heat-activatable polyurethane and optionally the solvent, as well as the compressed, preheated gas are supplied to a mixing station M and are intermixed intensively by means of a static mixer at the pressures described above. Here, some of the compressed gas dissolves in the feed-polyurethane. The mass flow ratios between the compressible auxiliary agent and the feed-polyurethane are between 0.5 kg/kg (kg compressible auxiliary medium per kg feed-polyurethane) and 20 kg/kg, preferably between 2 kg/kg and 10 kg/kg. Sulzer melt mixers are utilized as static mixers. The Kenics, Fluitec or Ross models or any other static fittings which promote intermixing, or combinations or geometric variations thereof may be used.

After intermixing, the feed-polyurethane is expanded suddenly by an expansion device E in a spray tower S. The spray tower is operated at pressures of from 0.01 bar absolute to 20 bar absolute, preferably from 0.2 bar to ambient pressure. One-component nozzles preferably serve as the expansion elements, but two-component nozzles or other expansion elements such as capillaries, valves, orifices or the like may also be utilized.

A finely divided, dry, tack-free powder results, despite the feed polyurethane being a high-viscosity, highly cohesive, heat-activatable polyurethane having delayed crystallisation.

The polyurethane powder, gas and optionally evaporated solvent are extracted from the spray tower S and guided to a cyclone Z. In the cyclone Z the powder is separated from the compressible auxiliary medium and optionally the vapor-form solvent. The finely divided polyurethane powder is obtained at the cyclone bottom. The finest powder particles may be cleaned from the solvent-gas mixture by an electro-filter. The gas and the solvent are removed by a fan G and subsequently may undergo solvent separation. Radial or axial fans, side channel vacuum pumps, jet pumps, slide vane rotary vacuum pumps, disk piston blowers or the like serve as conveying elements for the solvent-gas mixture, depending on the desired absolute pressure in the spray tower.

Figure 2:
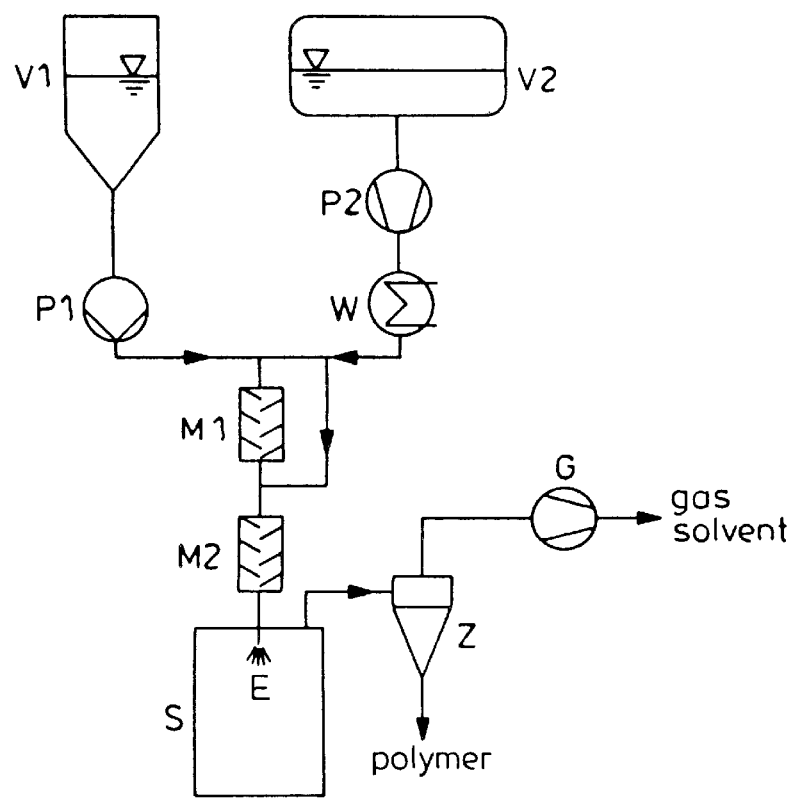
FIG. 2 represents a second embodiment of the process according to the invention.

FIG. 2 illustrates a further embodiment of the process according to the invention. This is similar to embodiment 1, however compressible auxiliary medium is dispensed in additionally, still upstream of the expansion element, specifically between two tube sections M1 and M2 which are suitable for intermixing, which may be equipped with different static mixers. As a result the intermixing elements can be operated at more favourable mass flow ratios of compressible auxiliary agent to feed-polyurethane mixture, and a higher content dissolved compressible agent can moreover be obtained.

Figure 3:
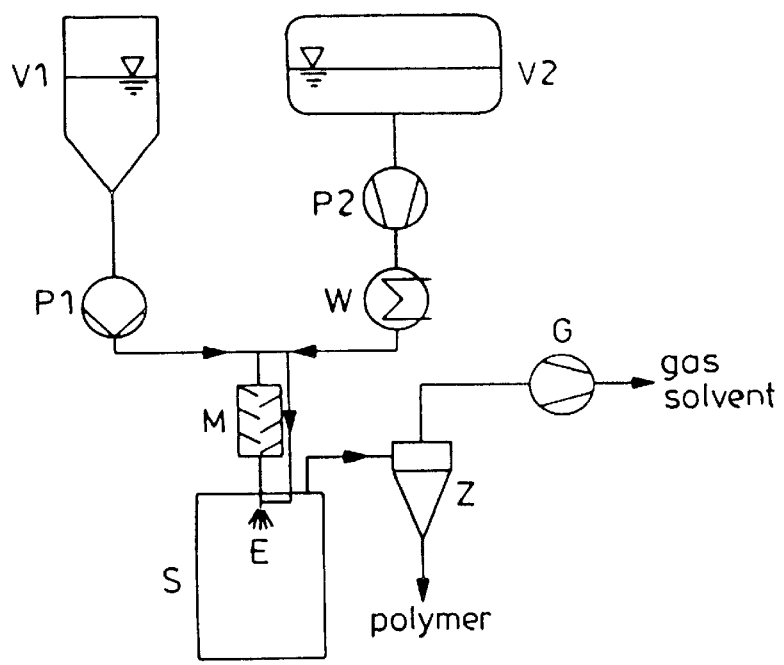
FIG. 3 represents a third embodiment of the process according to the invention.

A further embodiment of the process according to the invention is illustrated in FIG. 3. This is again similar to embodiment 1, however a dual-substance nozzle is utilized as expansion device E. In this case in addition to or in place of the gas dissolved in the feed-polyurethane, further compressed compressible auxiliary agent can here contribute kinetic energy to the size reduction of the melt droplets. The additionally added compressible auxiliary agent is not necessarily—as illustrated for simplicity in FIG. 3—constituted by the same substance as that from supply vessel V2.

Figure 4:
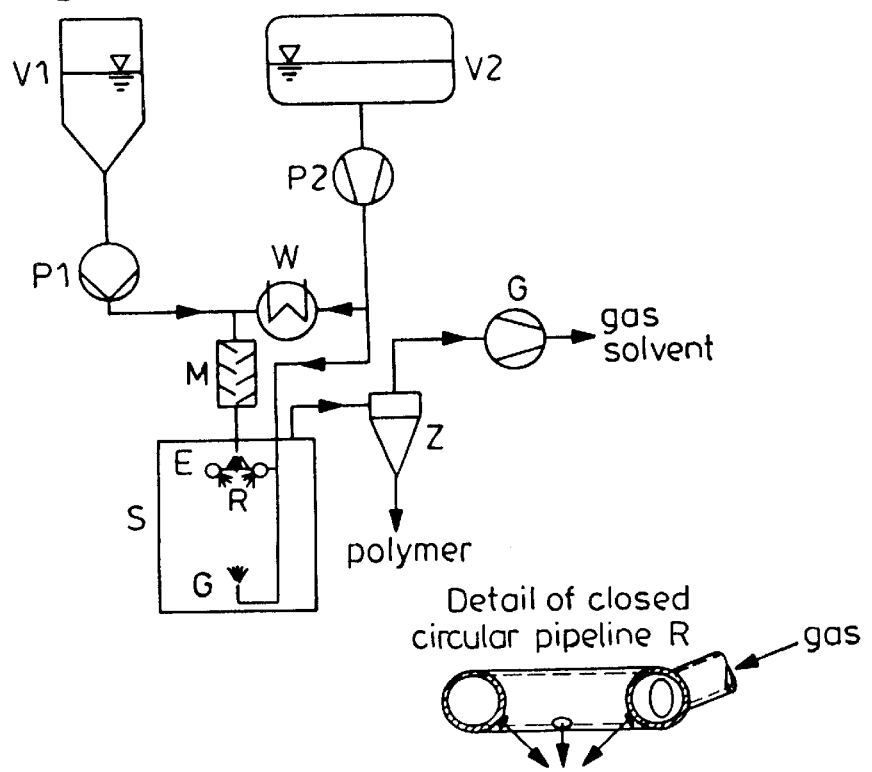
FIG. 4 represents a fourth embodiment of the process according to the invention.

Alternatively, an embodiment according to FIG. 4 may be selected for carrying out the process according to the invention, in which the procedure is as described for embodiment 1, however a curtain of highly compressible agent is generated in a circular pipeline R for cooling the melt droplets. The closed circular pipeline R consists of a pipe curved into a circle, with compressible auxiliary agent feeding which is preferably arranged in a manner orthogonal to the expansion device. Fine drilled holes which generate the gas curtain described are introduced into the circular pipeline thus an annular nozzle is formed. The annular nozzle sits immediately below the expansion device E. Other devices which cool the melt in a similar manner directly after it leaves the expansion device may also be used. The additional blowing-in of compressed auxiliary agent can pre-cool the spray tower simultaneously. This additional expansion device need not be attached directly to the expansion device E; pre-cooling in counter-current to the particles is also possible. In FIG. 4 the additional expansion device is constituted by the counter-current nozzle G. One-component hollow-cone nozzles are preferably utilized, but fan nozzles, solid-cone nozzles, valves and capillaries may also be used.

Figure 5:
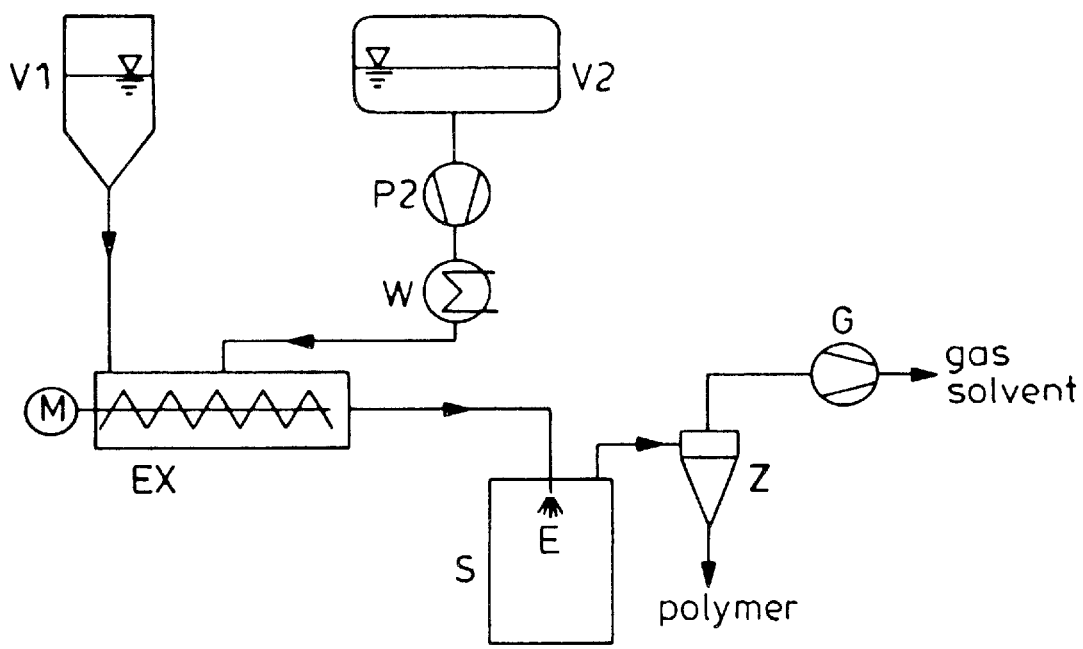
FIG. 5 represents a fifth embodiment of the process according to the invention.

A further embodiment of the process according to the invention is illustrated in FIG. 5. This is again similar to embodiment 1, however an extruder EX is utilized in place of the pump P1 for conveying the feed-polyurethane. Single-, twin- or multiple-screw extruders or planetary extruders may be used, the choice being determined by those skilled in the art, depending on the parameters of the actual case. The feed-polyurethane can also be melted in the extruder EX. The compressible auxiliary agent is dispensed in the mixing zone of the extruder EX and is mixed intensively with the feed-polyurethane. The melt is then expanded suddenly into a spray tower as in the embodiment according to FIG. 1, that is to say at pressures of between 50 bar and 1000 bar, preferably between 80 bar and 800 bar, in particular between 100 bar and 600 bar.

Figure 6:
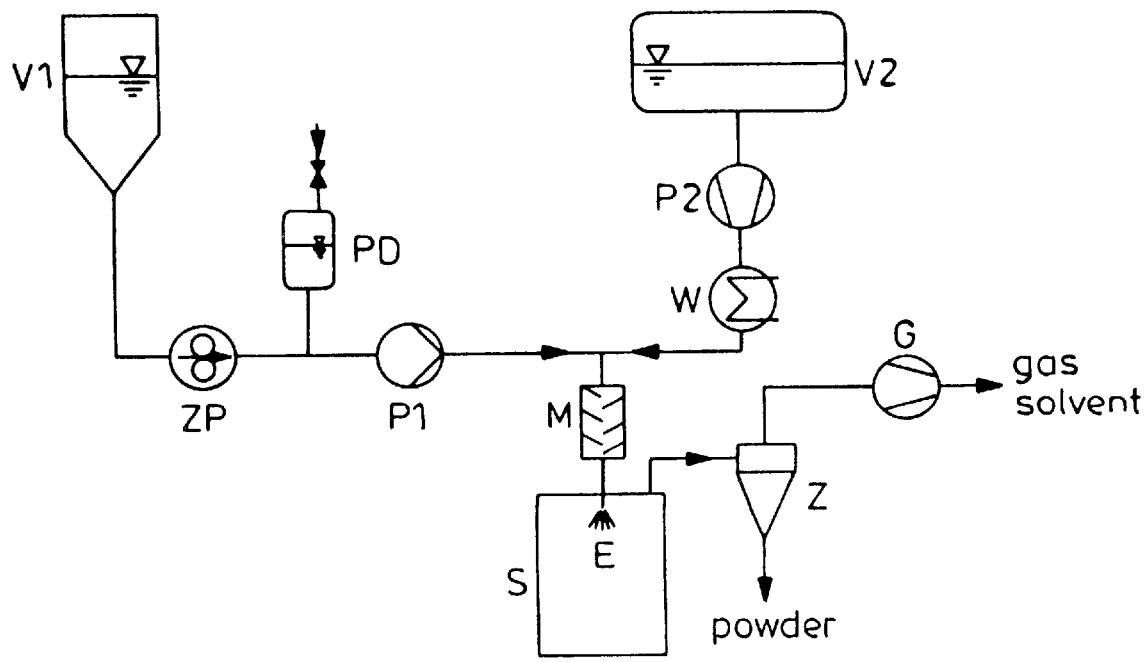
FIG. 6 represents a sixth embodiment of the process according to the invention.

A further preferred embodiment of the process according to the invention is illustrated in FIG. 6. This is again similar to embodiment 1, however a combination of a gear pump ZP as the admission pump and a diaphragm pump P1, preferably a multiple-head diaphragm pump, is utilized to convey the feed-polyurethane. An attenuator PD may be arranged between the pumps in order to match the quantities conveyed by both pumps. This arrangement of the conveying elements prevents gas surge-back to the suction side at high pressures. The compression-rigid characteristic of the multiple-head diaphragm pump simultaneously enables high constancy and low pulsing of the dispensed stream.

The invention is further illustrated but is not intended to be limited by the following examples in which all parts and percentages are by weight unless otherwise specified.

EXAMPLES

Example 1

The heat-activatable polyurethane (Desmocoll® 540, Bayer AG, DE) had a crystallite melting point of approx. 50° C. (according to DSC at a heating rate of 20 K/min) and a recrystallisation time of approx. 19 min at 23° C. (time taken for a pressed film approx. 6 mm thick to reach 90% of maximum Shore A hardness after 25 min storage at 75° C.). The polyurethane had a viscosity of 100 to 300 mPa·s at 23° C. (15 wt. % in butanone).

The heat-activatable polyurethane was processed in an apparatus in accordance with FIG. 1. For this purpose the polyurethane was melted in the supply container V1 and the temperature thereof was thermostated at 135° C. The melt was conveyed by a diaphragm pump to the mixing station, a Sulzer melt mixer of the SMX type. Carbon dioxide ("electronic quality", AGA Gas GmbH & Co. KG, DE) serves as the compressible auxiliary agent. The carbon dioxide was compressed to 160 bar by a diaphragm-type compressor and heated to 85° C. in a tube coil heat exchanger. After the intensive intermixing in the static mixer at approx. 93° C. the polyurethane-carbon dioxide mixture was expanded by a hollow-cone nozzle (bore diameter 0.7 mm, spray cone 90°). The mass flow ratio of carbon dioxide to polyurethane was here 8:1. At an absolute pressure of 0.95 bar a temperature of 26° C. was adjusted in the spray tower. The polyurethane powder which resulted was separated from the carbon dioxide with the aid of a cyclone. The carbon dioxide was extracted by an extractor fan. A finely divided polyurethane powder was obtained.

Example 2

The heat-activatable polyurethane was processed in an apparatus in accordance with FIG. 1. For this purpose a polyurethane-solvent mixture containing 95 wt. % of the polyurethane according to Example 1 and 5 wt. % toluene was placed in the supply container V1 at 135° C.

A diaphragm pump conveyed the polyurethane-toluene mixture to the mixing station equipped with a Sulzer SMX melt mixer. Here the polyurethane-toluene mixture was intermixed with the carbon dioxide which was compressed to approx. 205 bar and heated to 90° C. The mass flow ratio of carbon dioxide to polyurethane-toluene mixture was approx. 7:1. The polyurethane-toluene-carbon dioxide mixture was expanded by a hollow-cone nozzle (bore diameter 0.8 mm, spray cone 90°). At an absolute pressure of 0.95 bar in the spray tower a spray tower temperature of 17° C. results. The carbon dioxide and the vapor-form solvent toluene were drawn off by a fan, and the fine polyurethane powder was separated in a cyclone.

A finely divided polyurethane powder having a residual solvent content of less than 1.0 wt. % was obtained.

Example 3

The heat-activatable polyurethane was processed in an apparatus in accordance with FIG. 1. For this purpose a polyurethane-solvent mixture containing 40 wt. % of the polyurethane according to Example 1 and 60 wt. % toluene was placed in liquid form in the supply container V1 at 130° C.

A pump P1 conveyed the polyurethane-toluene mixture to the mixing station having a Sulzer SMX melt mixer. There the polyurethane-toluene mixture was intermixed with the carbon dioxide which was compressed to approx. 170 bar and heated to 105° C. The mass flow ratio of carbon dioxide to polyurethane-toluene mixture was approx. 16:1. The polyurethane-toluene-carbon dioxide mixture was expanded by a hollow-cone nozzle (bore diameter 0.7 mm, spray cone 90°). At an absolute pressure of 0.95 bar in the spray tower a spray tower temperature of 18° C. resulted. The carbon dioxide and the vapor-form solvent toluene were extracted by a fan, and the fine polyurethane powder was separated in a cyclone.

A finely divided polyurethane powder having a residual solvent content of less than 4.0 wt. % was obtained.

Example 4

The heat-activatable polyurethane was processed in an apparatus accordance with FIG. 1. For this purpose a polyurethane-solvent mixture containing 70 wt. % of the polyurethane according to Example 1 and 30 wt. % acetone was placed in the supply container V1 at 130° C.

A diaphragm pump conveyed the polyurethane-acetone mixture to the mixing station having a Sulzer SMX melt mixer. There the polyurethane-acetone mixture was intermixed with the carbon dioxide which was compressed to approx. 130 bar and heated to 105° C. The mass flow ratio of carbon dioxide to polyurethane-acetone mixture was approx. 12:1. The polyurethane-acetone-carbon dioxide mixture was expanded by a hollow-cone nozzle (bore diameter 0.7 mm, spray cone 90°). At an absolute pressure of 0.95 bar in the spray tower a spray tower temperature of 28° C. results. The carbon dioxide and the vapor-form solvent acetone were extracted by a fan, and the fine polyurethane powder was separated in a cyclone.

A finely divided polyurethane powder having a residual solvent content of less than 1.0 wt. % was obtained.

Example 5

The heat-activatable polyurethane was processed in an apparatus in accordance with FIG. 4. For this purpose a polyurethane-solvent mixture containing 99 wt. % of the polyurethane according to Example 1 and 1 wt. % a toluene was placed in the supply container V1 at 130° C.

A diaphragm pump conveyed the polyurethane-toluene mixture to the mixing station equipped with a Sulzer SMX melt mixer. There the polyurethane-toluene mixture was intermixed with the carbon dioxide which was compressed to approx. 170 bar and heated to 90° C. The mass flow ratio of carbon dioxide to polyurethane-toluene mixture was approx. 12:1. The polyurethane-toluene-carbon dioxide mixture was expanded by a hollow-cone nozzle (bore diameter 0.7 mm, spray cone 90°). A closed circular pipeline having 4 inwardly directed drilled holes through which the compressed carbon dioxide was blown in was arranged directly below the hollow-cone nozzle. At an absolute pressure of 0.95 bar in the spray tower a spray tower temperature of 2° C. resulted. The carbon dioxide and the vapor-form solvent toluene were extracted by a fan, and the fine polyurethane powder was separated in a cyclone.

The powder obtained has a residual solvent content of less than 0.3 wt. %.

Example 6

The heat-activatable polyurethane was processed in an apparatus in accordance with FIG. 5. For this purpose a polyurethane-solvent mixture containing 99 wt. % of the polyurethane according to Example 1 and 1 wt. % toluene was melted with the aid of a twin-screw extruder.

Downstream of the intake and melting zone carbon dioxide was dispensed into the extruder by means of a high-pressure diaphragm proportioning pump. In the mixing zone of the extruder the carbon dioxide was intermixed with and dissolved in the polyurethane-toluene mixture. The polyurethane-toluene-carbon dioxide mixture was then expanded by means of a hollow-cone nozzle (bore diameter 0.7 mm, spray cone 90°) into a spray tower. The temperature in the spray tower was approx. 18° C., and the pressure was approx. 0.95 bar absolute. The carbon dioxide and the solvent toluene were extracted by a fan, and the fine polyurethane powder was separated in a cyclone.

The polyurethane powder thus obtained has a residual solvent content of less than 0.3 wt. %.

The material obtained according to the invention was eminently suitable for the manufacture of solution adhesives because it dissolves considerably more rapidly than comparable granules due to its fine division and large specific surface, provided that agglomeration of the swelling particles was avoided during dispensing by suitable measures such as vigorous stirring. The adhesive solution thus obtained had the same adhesive properties as a similar solution of a prior art polyurethane and was suitable for one- or two-component processing in known manner.

The material obtained according to the invention was also suitable, depending on particle size distribution, directly as a powdered adhesive for various bonding processes such as scatter coating and paste dot and double dot processes. This constitutes a particular technical advantage, because in other processes such powders do not arise in direct manner, but require—as mentioned above—labor-intensive, costly reworking by cold grinding.

The material according to the invention may naturally be prepared further, depending on the application and need, such as by compacting, further comminution or by the imparting of antistatic properties.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of particles from a solution or melt of a heat-activatable polyurethane which comprises the reaction product of:
   a) a crystallizing oligomeric dihydroxy compound,
   b) optionally an amorphous oligomeric dihydroxy compound in an amount by weight which is less than the amount of component a),
   c) an aromatic and/or aliphatic diisocyanate and d) optionally a low molecular weight difunctional chain extender, optionally in admixture with
e) a light stabilizer, antioxidant, powdering agent or a polyfunctional cross-linking compound, which comprises:
- i) dissolving a compressible auxiliary agent at a pressure of between 50 and 1000 bar into a conveyable solution or melt of a heat-activatable polyurethane having a polyurethane content of between 40 and 100 wt. % and a solvent content of 0 to 60 wt. % to obtain a mixture of polyurethane, compressible auxiliary agent and optionally solvent,
- ii) optionally adjusting of the temperature of the resulting mixture to a temperature of from 40° K below to 150° K above the crystallite melting point of the polyurethane,
- iii) expanding the mixture by means of an expansion device into a container, while adjusting the temperature in the container to at least 5° K below the softening temperature of the polyurethane to maintain the open jet particles in a form in which they do not agglomerate, and
- iv) separating the formed particles from the stream of decompressed compressible auxiliary agent and optionally solvent.

2. The process of claim 1 wherein the crystallizing oligomeric dihydroxy compounds comprise polyesters having a number average molecular weight of between 500 and 5000 g/mol.

3. The process of claim 1 wherein the aromatic diisocyanates comprise MDI and/or TDI and the aliphatic isocyanates comprise HDI, $H_6$-TDI, $H_{12}$-MDI and/or IPDI.

4. The process of claim 1 wherein the low molecular weight chain extender is present and comprises a diol.

5. The process of claim 1 wherein the optional cross-linking compound is present and comprises a polyfunctional isocyanate in blocked or free form.

6. The process of claim 1 wherein the polyurethane is dissolved in an organic solvent or solvent mixture.

7. The process of claim 6 wherein the organic solvent or solvent mixture is present in a positive amount to 60 wt. %, based on the total weight of the mixture of polyurethane and solvent.

8. The process of claim 1 wherein the polyurethane is solvent-free.

9. The process of claim 1 wherein the compressible auxiliary agent comprises carbon dioxide, an n- or iso-alkane, an n- or iso-alkene, a halogen-containing hydrocarbon, an ether, a nitrogenous compound and/or sulfur hexafluoride.

10. The process of claim 1 wherein the compressible auxiliary agent comprises carbon dioxide.

11. The process of claim 1 wherein the pressure during the dissolution of the compressible auxiliary agent is within the range 80 to 800 bar.

12. The process of claim 1 wherein the temperature during the dissolution of the compressible auxiliary agent is between 40° K below and 150° K above the crystallite melting point of the solvent-free polyurethane.

13. The process of claim 1 wherein the process is operated in a continuous manner.

14. The process of claim 1 wherein the dissolution of the compressible auxiliary agent takes place in a static mixer.

15. The process of claim 1 wherein a nozzle is used as the expansion device.

16. The process of claim 1 wherein the particles formed are separated in fractional manner.

17. The process of claim 16 wherein the particle stream to the fractional separation is guided first through a spray tower, a cyclone and a fine filter.

* * * * *